United States Patent [19]

Faulkner et al.

[11] 3,852,600

[45] Dec. 3, 1974

[54] X-RAY METHOD AND APPARATUS FOR DETECTING MISLOCATION OF STEEL REINFORCEMENTS IN GREEN TIRES

[75] Inventors: John E. Faulkner; J. Richard Hansen, both of Pittsburgh; Eugene G. Vaerewyck, Murrysville, all of Pa.

[73] Assignee: Westinghouse Electric Corporation, Pittsburgh, Pa.

[22] Filed: Feb. 21, 1973

[21] Appl. No.: 334,513

[52] U.S. Cl.................. 250/360, 250/312, 250/367
[51] Int. Cl.............................................. G01t 1/20
[58] Field of Search ........... 250/358, 359, 360, 308, 250/312, 367

[56] References Cited
UNITED STATES PATENTS

| | | | |
|---|---|---|---|
| 3,405,267 | 10/1968 | Chope................................ | 250/308 |
| 3,550,443 | 12/1970 | Sherkin.............................. | 250/360 |
| 3,614,432 | 10/1971 | Green................................ | 250/360 |
| 3,621,246 | 11/1971 | Horsey............................... | 250/360 |

*Primary Examiner*—Harold A. Dixon
*Attorney, Agent, or Firm*—D. F. Straitiff

[57] ABSTRACT

A plurality of X-ray detectors at precise locations relative to the centerline of the tread-stock region of a green tire, operate to sense location of certain X-ray intensities in the axialwise direction of the tire to detect sidewise mislocation of steel reinforcements such as belts, chafer strips, bead bundles, etc., embedded within the uncured rubber layers of such tire while being subjected to penetrative X-ray irradiation and while being turned about its central axis. A horizontal rotating inspection drum on which such green tire is loosely fit, serves to effect such tire turning, and by use of a stripe marking the threadstock centerline and a stripe-tracking servo mechanism, certain desired centerline-oriented locations of the detectors are preserved automatically in the presence of any widthwise wander of the tire on the rotating inspection drum.

7 Claims, 10 Drawing Figures

X-RAY METHOD AND APPARATUS FOR DETECTING MISLOCATION OF STEEL REINFORCEMENTS IN GREEN TIRES

BACKGROUND OF THE INVENTION

The field of the invention is the X-ray inspection of tires.

Prior art techniques for inspection of tires by X-ray have included image-producing means that translate the penetrative X-ray radiation passed through the tire into visible picture form for analysis of the internal shadow image of the tire as thus depicted, as well as adjustable means for turning different sized tires during the inspection. Reliance on either or both of these arrangements results in a complexity that renders automatic inspection of tires at such as production line rates difficult, if not impossible.

SUMMARY OF THE INVENTION

The present invention, in employing individual detector means to read out only critical shadow image sidewise location information, rather then forming a complete picture on a fluoroscope or TV monitor screen, for example, affords opportunity for a degree of simplicity which enhances opportunity for automation of the inspection technique of this invention. Use of the turning drum which loosely supports different sized tires for inspection, also contributes to such simplicity.

DESCRIPTION OF THE PREFERRED EMBODIMENTS

Figure 2:
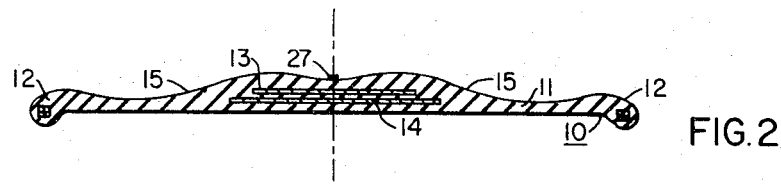
FIG. 2 is a section view taken along the line II—II in FIG. 1.
Figure 1:
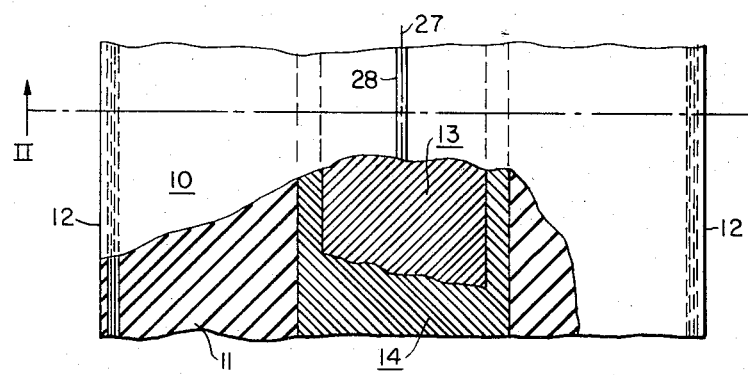
FIG. 1 is a partial cutaway view of a portion of a steel-belted green tire as viewed radially inward toward its tread-stock region.

Referring to FIGS. 1 and 2, a typical steel-belted green tire 10 is in the form of a hollow cylinder of somewhat soft uncured rubber 11 having reinforced bead portions 12 at opposite edges and different-width stranded-steel belts 13 and 14 embedded in a central thickened tread-stock region 15 of the tire; it being appreciated that the green tire is made up of layers of uncured rubber, belts, etc., which may be unwound for repositioning to correct misalignment of the belts, when found necessary, even though the cross section of rubber 11 is shown in the drawing as being non-layered, in behalf of simplifying such showing.

Figure 3:
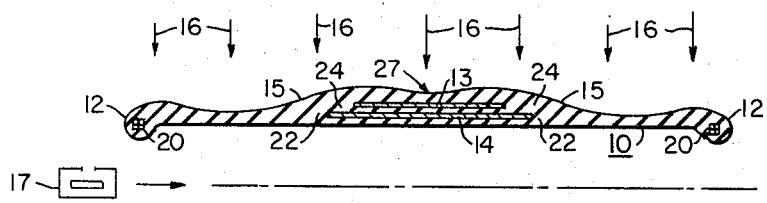
FIG. 3 is a similar view depicting a green tire being subjected to radially-inwardly directed X-rays.
Figure 4:
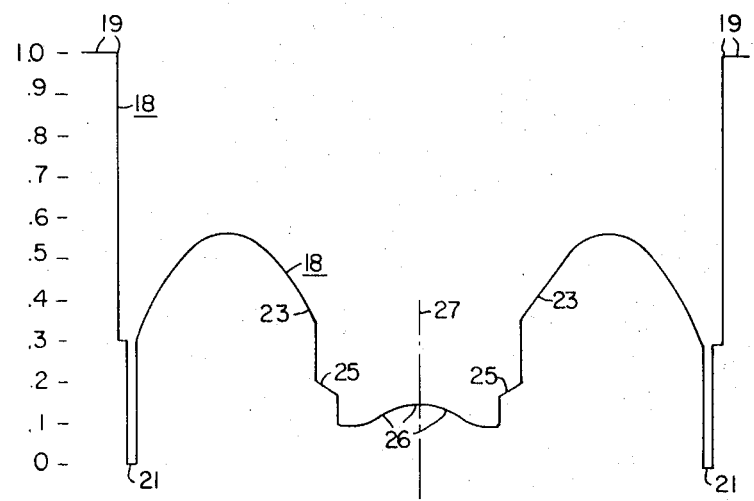
FIG. 4 is a graph depicting variation in level of intensity of X-rays passing through the tire section of FIG. 3 from one bead edge to the other.

In accord with operating principles involved in the present invention, if the green tire 10, FIG. 3, is suitably supported and subjected to irradiation by X-rays 16 of sufficient hardness to penetrate its cross-sectional thickness and in distribution from one bead edge 12 to the other, the intensity of the X-rays passing through the tire section, as measured by such as a narrow-slit detector 17, will be found to vary from one bead edge 12 to the other somewhat as represented by the curve 18 in FIG. 4. Outside the tire, transmission is maximum signal level 19 in curve 18. At the site of steel reinforcing bundles 20, FIG. 3, in the tire bead edges 12, the transmission through the tire is minimal, signal level 21 in FIG. 4. At locations 22, FIG. 3, immediately outside the edges of the wider steel belt 14, the transmission signal level is at 23 in FIG. 4. The widthwise regions 24 between the edges of the two belts 13 and 14 are at signal levels 25, and the overlapping region of the two belts is at levels 26.

Prime objectives of the present invention are to detect mislocation of steel reinforcements, such as the steel belts 13 and/or 14 within the green tire section 10, width of the belts and absence of any such reinforcements. Such detection while the tire is thus in its uncured state can enable corrective repositioning of the reinforcements. To accomplish such detection, the present invention senses the location of the reinforcement edges relative to the centerline 27 of the tire section as established while the tire is still on the collapsible drum (not shown) on which it was fabricated as by marking a light-colored stripe 28 around the circumference of the green tire at such centerline location.

Figure 5:
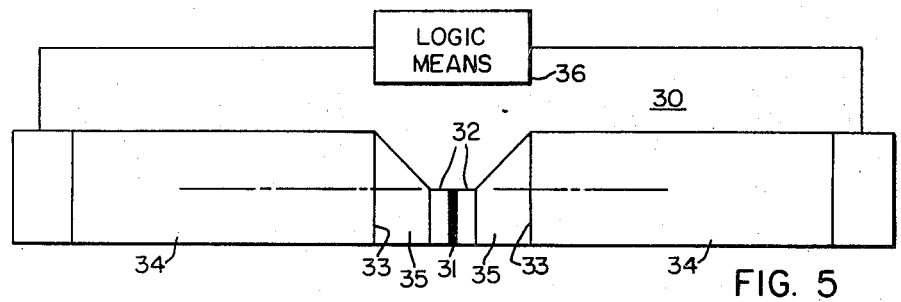
FIG. 5 is a schematic representation of a dual detector assembly employed in a preferred embodiment of the present invention.

In accord with other features of the invention, such sensing of the location of the reinforcement edges is accomplished by use of X-ray detector assemblies 30, each of which measures the difference in X-ray intensity at opposite sides of a narrow light-barrier region 31, FIG. 5, aligned with the intended location of a reinforcement edge as determined by position relative to a tire centerline reference. X-rays reaching the detector assembly 30 at opposite sides of the center light-barrier region 31 strike respective scintillation elements 32 that produce light signals that are coupled to the input ends 33 of respective photomultiplier tubes 34 by way of respective light pipe elements 35. The scintillation elements 32 may be of hemicylindrical shape, as shown in FIG. 5, and the light pipe elements are suitably shaped to couple the semicircular faces of elements 32 to the round end faces of the photomultiplier tubes 34. The width of light-barrier region 31 is not critical, but preferably is thin, and the width of the scintillation elements 32 can be chosen according to the degree of belt misalignment to be tolerated by the tire manufacturer performing the inspection. Output from the one photomultiplier tube 34 is compared with that of the other in a logic circuit means 36 to determine displacement and direction of displacement of a reinforcement edge from a desired location. Rotation of the tire enables a given detector assembly 30 to provide reinforcement-edge-location information for the complete circumference of such tire.

Other logic means affiliated with other detector assemblies provides information with respect to number and width of reinforcement elements.

Figure 6:
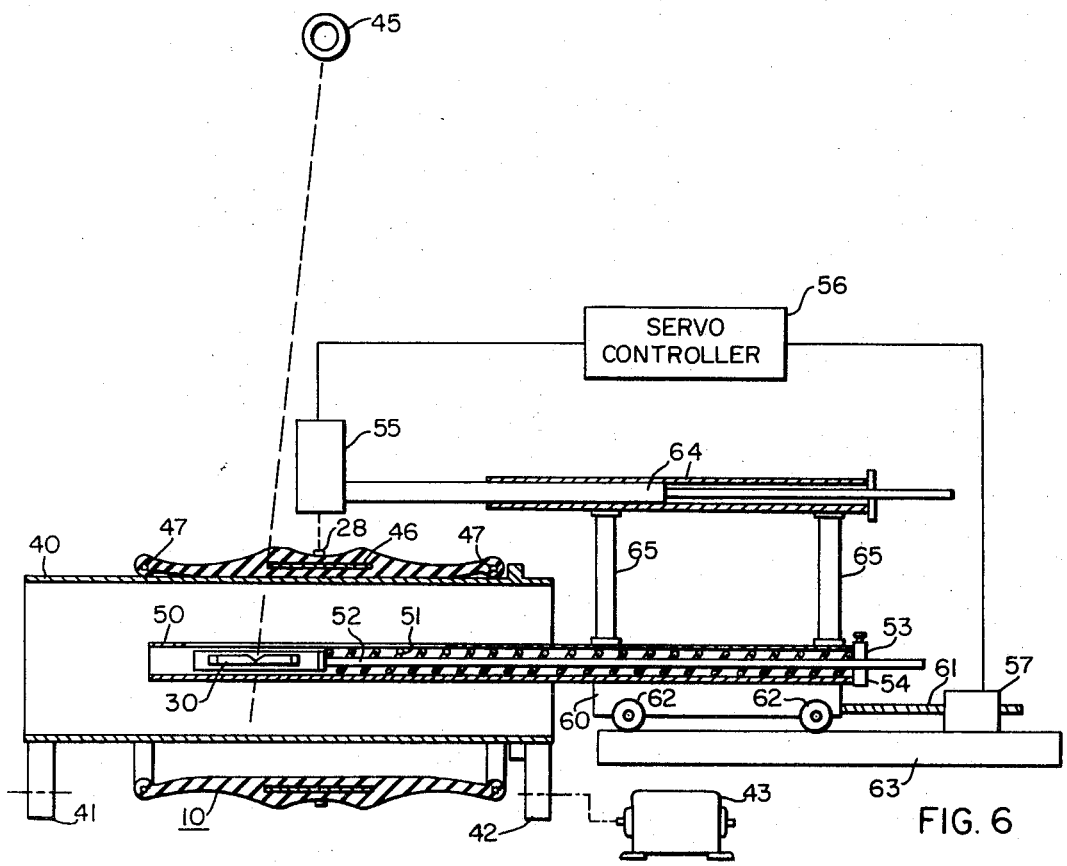
FIG. 6 is a side elevation view, partly in outline and partly in section, of novel portions of the apparatus of the present invention.
Figure 7:
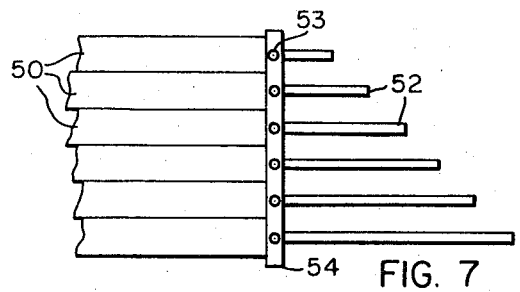
FIG. 7 is a top fragmented view, in outline, of a portion of the apparatus of FIG. 6.

Referring to FIG. 6, apparatus suitable for the X-ray inspection of steel-belted green tires of non-radial type is exemplified. For supporting such green tire 10, which is hollow cylinder shape, a hollow cylindrical turning drum 40 mounted on rollers 41 and 42 at its opposite ends is provided. Drum 40 is driven via a motor and one or both of the rollers 41 and 42 on which it rests and this in turn effects turning of the green tire 10 loosely supported in encirclement of such drum; by a rolling action of the tire on the drum. An X-ray tube 45 of sufficiently high voltage, 80 KV for example, and adequate beam width subjects the tire 10 to X-rays directed radially inward toward an array of detector assemblies 30, only one of which is shown, which are disposed inside the drum 40 and arranged at suitable widthwise locations to detect mislocations of steel reinforcement edges, such as those of the steel belt 46, or of the two belts 13 and 14 in the tire section of preceding FIGS. 1-3, bead-reinforcement strips 47, belt widths, number of reinforcement layers etc. To facilitate adjustment of the positions of the several detector assemblies 30 to suit different tire sizes and reinforcement locations, such assemblies are disposed in respective X-ray transparent tubes 50 and are located therein by action of respective helical tension springs 51 that hold such assemblies against the projecting ends of adjustable stop rods 52 locked in adjusted positions by set screws 53 affiliated with a common support member 54 for such rods.

In accord with an adjunctive feature of the present invention, the stripe 28 at the centerline of the tire tread-stock region is tracked by a photo-optical pickup means 55 that commands a servo controller means 56 that controls a servo motor means 57 that drives the pickup means 55 and the detector assembly 30 array to follow any sidewise movement of stripe 28, such as may occur as a result of the loose, rolling relationship existing between the tire and turning drum. The pickup means 55 and tubes 50 within which the assemblies 30 are disposed are mounted on a common support member 60, which is movable by the motor means 57 via such as a worm drive 61 and is movably supported via rollers 62 on a base 63. A telescopic rod assembly 64 supports the pickup means at its end, and such rod assembly is supported on member 60 via pedestal support elements 65.

Figure 8:
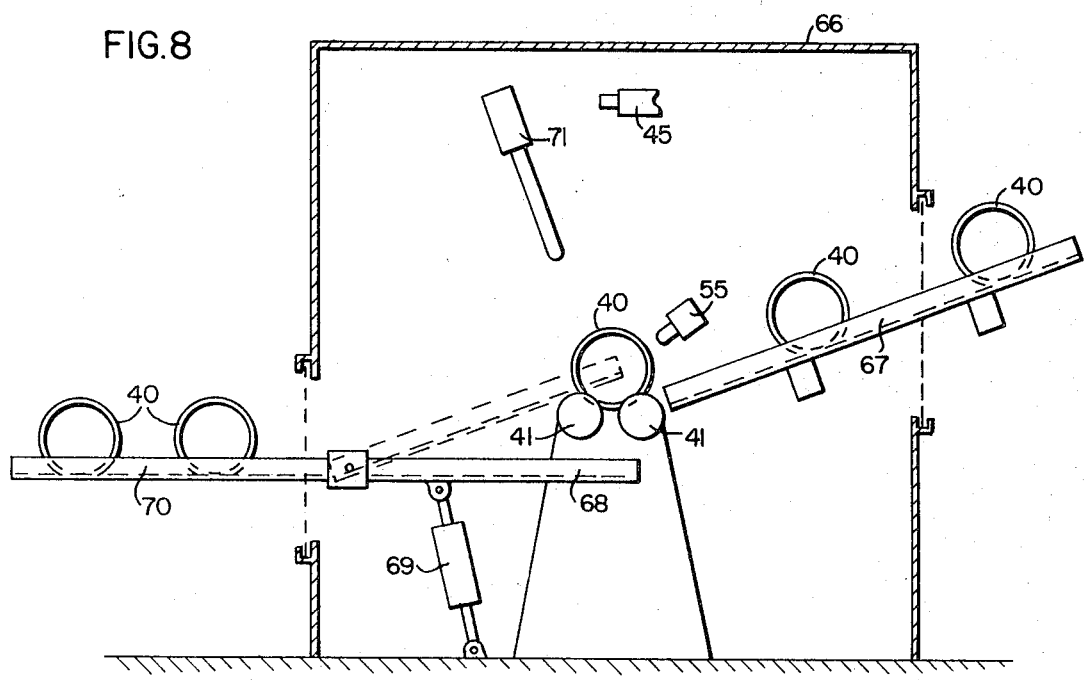
FIG. 8 is a front elevation view of an exemplification of inspection apparatus of the present invention as including one arrangement for automatic handling of green tires to and from an inspection station.

Referring to FIG. 8, an arrangement is shown for accommodating automatic handling of the green tires to and from the inspection station as disposed within a shielded cubicle housing 66, an entrance rampway 67 feeds a series of turning drums 40 downwardly through an entrance portal to the support rolls 41 and 42 (not shown) at the station as viewed from the open end of the drum when in working position. The turning drums 40 may be preloaded with green tires (not shown) prior to introduction to the rampway 67. A pivotal removal rampway 68 actuable by a cylinder 69 is raisable at one end to lift a tire-laden turning drum up from the support rolls 41 and 42 to cause such drum to roll out of the inspection station at completion of each inspection and leave the cubicle housing via an exit portal and a removal ramp 70. A paint sprayer 71 may be provided for marking tires detected to have anomolies in their steel reinforcements.

It should be mentioned that the apparatus and technique of the present invention is capable also of locating "dog ears" caused by belt end mislocations which project edgewise. The dog ear projections occur over limited circumferential regions of the tire and may be detected by a single detector suitably positioned outboard of a belt edge to sense dog ear presence during tire rotation.

Figure 9:
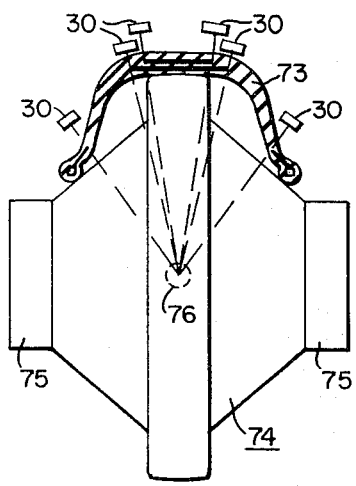
FIG. 9 is a side elevation view of an alternate inspection turning drum construction, with internal X-ray tube, particularly suited for turning support of green tires in radial ply form; and, FIG. 10 is an alternative arrangement for smaller-sized radial ply tires, where a pair of X-ray tubes at the exterior of the turning drum are used.
Figure 10:
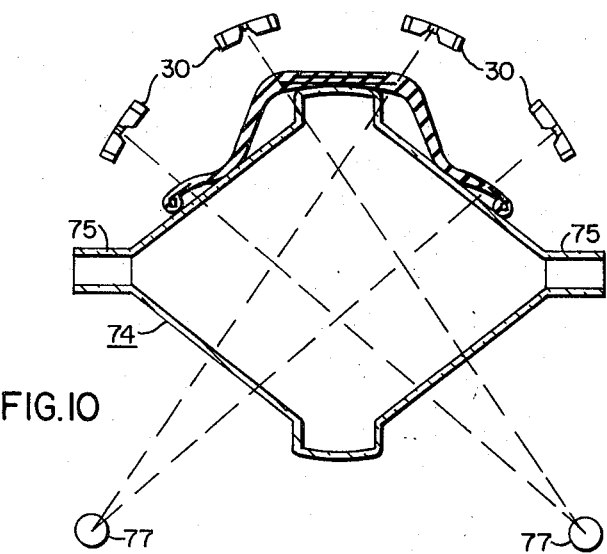

Referring to FIGS. 9 and 10, a green steel-reinforced radial ply tire 73 is concavo-convex in cross section, rather than cylindrical as conventional green tire 10 of preceding Figures. By use of hump-shaped turning drums 74, support of such green radial ply tires 73 can be provided beneath their treadstock region as well as at their bead edges. Cylindrical regions 75 at opposite ends of the drums 74 provide for rotary support by the rolls 41 and 42 as described previously herein. Larger sized drums 74 can accommodate disposition of a wide-angle x-ray tube 76 inside such drums, and the array of detector assemblies 30 for the various reinforcement edges are disposed at sites around the outside of the tire. Smaller sized drums 74 for smaller sized radial tires as in FIG. 10 may use a pair of suitably aimed X-ray tubes 77 outside the drum 74. With respect to automatic stripe-following centerline tracking adjustment in the FIG. 9 version of the inspection equipment, position of the detector assemblies will occur along circular paths having their centers at the X-ray tube 76. With respect to the FIG. 10 version of the equipment, both the detector assemblies 30 and the X-ray tubes adjust position along circular paths having their centers at the center of the drum 74.

We claim:

1. A method of inspecting a green tire for misalignment of metal reinforcing elements embedded therein, comprising the steps of:

marking a reference stripe at a particular widthwise location around the circumference of the green tire while yet remaining on the collapsible forming drum on which it was fabricated, placing the stripe-marked tire on rotary means for turning it about its central axis, directing penetrative radiation radially through a peripheral portion thereof while disposed on said rotary means, detecting the intensities of such radiation transmitted through the tire discretely at a plurality of select widthwise detector locations of such tire relative to said stripe, comparing the intensities so detected to give information with respect to location of the aforesaid metal reinforcing elements, and tracking the reference stripe on the tire during its rotation to automatically maintain the positional relationship between stripe and detector locations.

2. A method of inspecting a green tire for misalignment of reinforcing element embedded therein comprising the steps of:

placing the tire on rotary means for turning it about its central axis, directing penetrative radiation radially through a peripheral portion thereof while on said rotary means, detecting intensities of such radiation passing through the tire at a plurality of detector locations at opposite sides of a widthwise centerline of the tire, sensing simultaneous differences in localized intensity information so detected to give sidewise position information respecting the aforesaid reinforcing elements, and maintaining a fixed relationship between detector locations and said centerline while said tire is turning on said rotary means.

3. The method of inspecting a green metal-reinforced tire as set forth in claim 2, wherein the aforesaid rotary means is in the form of a hollow horizontal turning drum rotatable about its central axis and the tire undergoing inspection rests loosely on such drum and turned by rolling cooperation therebetween.

4. The method of inspecting green metal-reinforced tires as set forth in claim 3, wherein said turning drum may be introduced to and removed from a particular inspection station wherein the inspection is performed, and the method further includes the step of placing the tire to undergo inspection onto the turning drum prior to introducing such drum to the inspection station.

5. Apparatus for inspecting reinforcement-containing green tires, comprising, rotary means for turning the tire about its axis, an X-ray tube for directing X-rays radially through the tire while on said rotary means, a plurality of detectors at opposite sides of a widthwise centerline of the tire for detecting intensities of X-rays passing through the tire corresponding to sidewise location of reinforcements in such tire, positioning means for maintaining the location of said detectors fixed relative to said centerline, and logic circuit means accepting the simultaneous intensity information from such detectors and differentiating same to determine anomolies with respect to the position of side edges of such reinforcements.

6. The apparatus of claim 5, wherein said positioning means includes means for following sidewise deviation of the green tire during said turning to automatically adjust the positions of said detectors widthwise of said tire.

7. The apparatus for inspecting tires as set forth in claim 5, wherein said detectors comprise photomultiplier tubes viewing respective scintillation elements disposed on opposite sides of a narrow light barrier.

* * * * *